United States Patent
Musiani et al.

(10) Patent No.: US 12,488,381 B2
(45) Date of Patent: Dec. 2, 2025

(54) RETAIL STORE SELF-CHECKOUT STATION AND RELATED METHODS FOR PROVIDING INTERACTIVE VIRTUAL LANE FOR SMART SELF-CHECKOUTS

(71) Applicant: Datalogic IP Tech S.r.l., Calderara di Reno (IT)

(72) Inventors: Roberto Musiani, Bo (IT); Angelo Carraggi, Zola Predosa (IT); Maurizio De Girolami, Bo (IT)

(73) Assignee: Datalogic IP Tech S.r.l., Calderara di Reno (IT)

( * ) Notice: Subject to any disclaimer, the term of this patent is extended or adjusted under 35 U.S.C. 154(b) by 321 days.

(21) Appl. No.: 17/963,953

(22) Filed: Oct. 11, 2022

(65) Prior Publication Data
US 2024/0119512 A1    Apr. 11, 2024

(51) Int. Cl.
| | | |
|---|---|---|
| G06T 7/11 | (2017.01) | |
| G06Q 20/20 | (2012.01) | |
| G06Q 30/0601 | (2023.01) | |
| G06T 7/73 | (2017.01) | |
| G06V 20/52 | (2022.01) | |

(52) U.S. Cl.
CPC ....... *G06Q 30/0637* (2013.01); *G06Q 20/208* (2013.01); *G06T 7/11* (2017.01); *G06T 7/73* (2017.01); *G06V 20/52* (2022.01)

(58) Field of Classification Search
None
See application file for complete search history.

(56) References Cited

U.S. PATENT DOCUMENTS

| 2 A * | 7/1836 | Goulding ............... D01G 21/00 |
| | | 57/58.49 |
| 7,782,194 B2 | 8/2010 | Stawar et al. |
| 10,189,494 B2 * | 1/2019 | Hannah .................. H04W 4/02 |
| 12,033,481 B2 * | 7/2024 | Ramanathan ........ G06Q 20/208 |

(Continued)

FOREIGN PATENT DOCUMENTS

GB    2547524 A  *  8/2017    ......... B65B 67/1205

OTHER PUBLICATIONS

Extended European Search Report for EP Application No. 23202451.3 dated Nov. 24, 2023, 7 pages.

*Primary Examiner* — Akwasi M Sarpong
*Assistant Examiner* — Pawan Dhingra
(74) *Attorney, Agent, or Firm* — Foley & Lardner LLP

(57) ABSTRACT

A retail store self-checkout area may include a scanner configured to enable a shopper to scan items being purchased. A bagging area may be positioned at the scanner. A top-down facing camera positioned and oriented to image a shopping cart or basket at the self-checkout area and to generate image signals of the shopping cart or basket. A projector may be configured to project dynamically alterable illumination signals onto a surface visible to the shopper when at the self-checkout area to provide visual guidance information to the shopper. The projector may be a smart projector, and may be configured to be a top-down facing projector to illuminate a floor at the self-checkout area. A system controller may be configured to drive the projector (e.g., smart projector) and to process images captured by camera to identify errors or fraudulent behavior during a self-checkout process.

19 Claims, 9 Drawing Sheets

(56) References Cited

U.S. PATENT DOCUMENTS

| | | | |
|---|---|---|---|
| 2015/0112825 A1* | 4/2015 | Konishi | G07G 1/0018 |
| | | | 705/16 |
| 2015/0310601 A1* | 10/2015 | Rodriguez | G06Q 20/208 |
| | | | 348/150 |
| 2019/0188513 A1* | 6/2019 | Beghtol | G07G 1/0045 |
| 2021/0012308 A1* | 1/2021 | Uchimura | G06Q 20/208 |
| 2021/0327224 A1* | 10/2021 | Steiner | A47F 9/048 |
| 2022/0188796 A1* | 6/2022 | Ueki | G07G 1/06 |

* cited by examiner

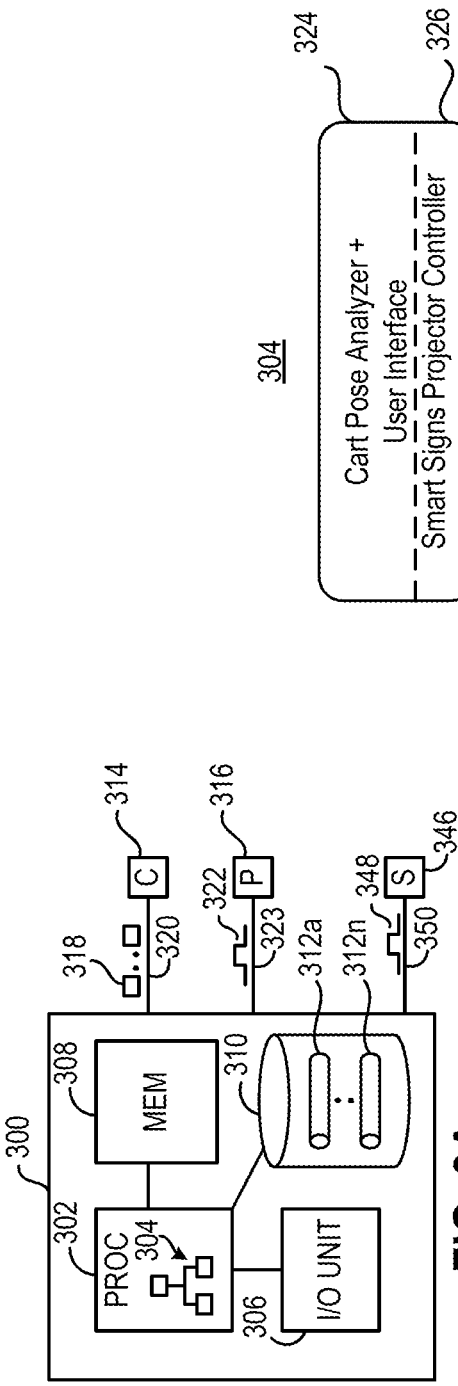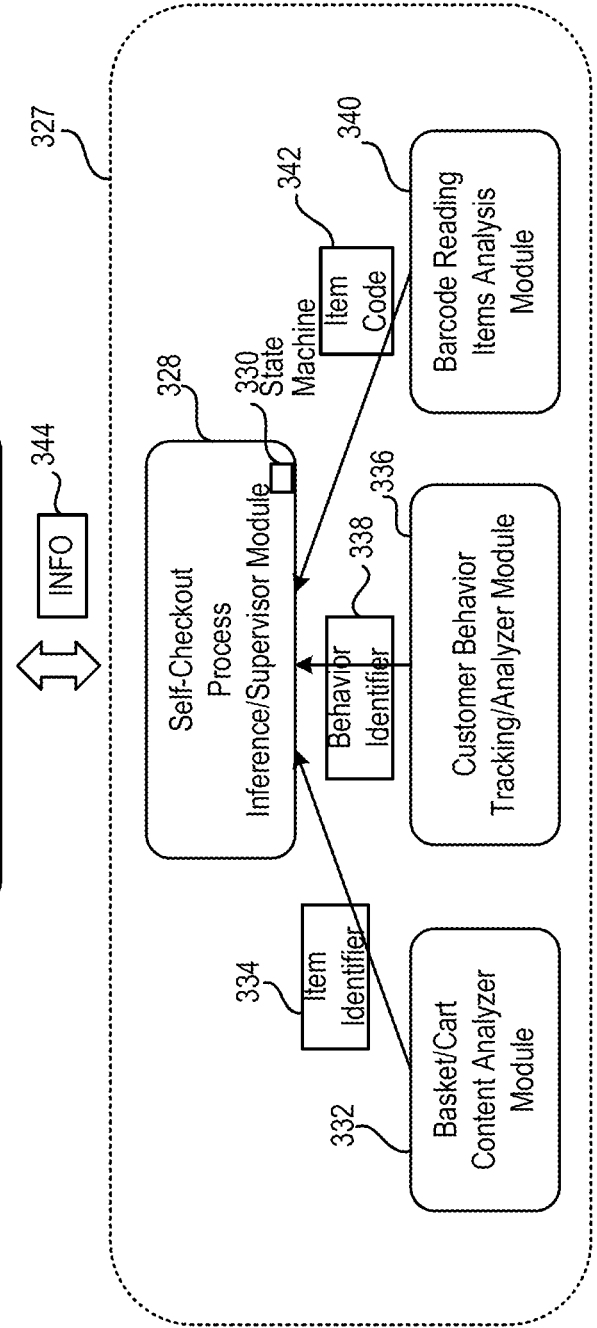

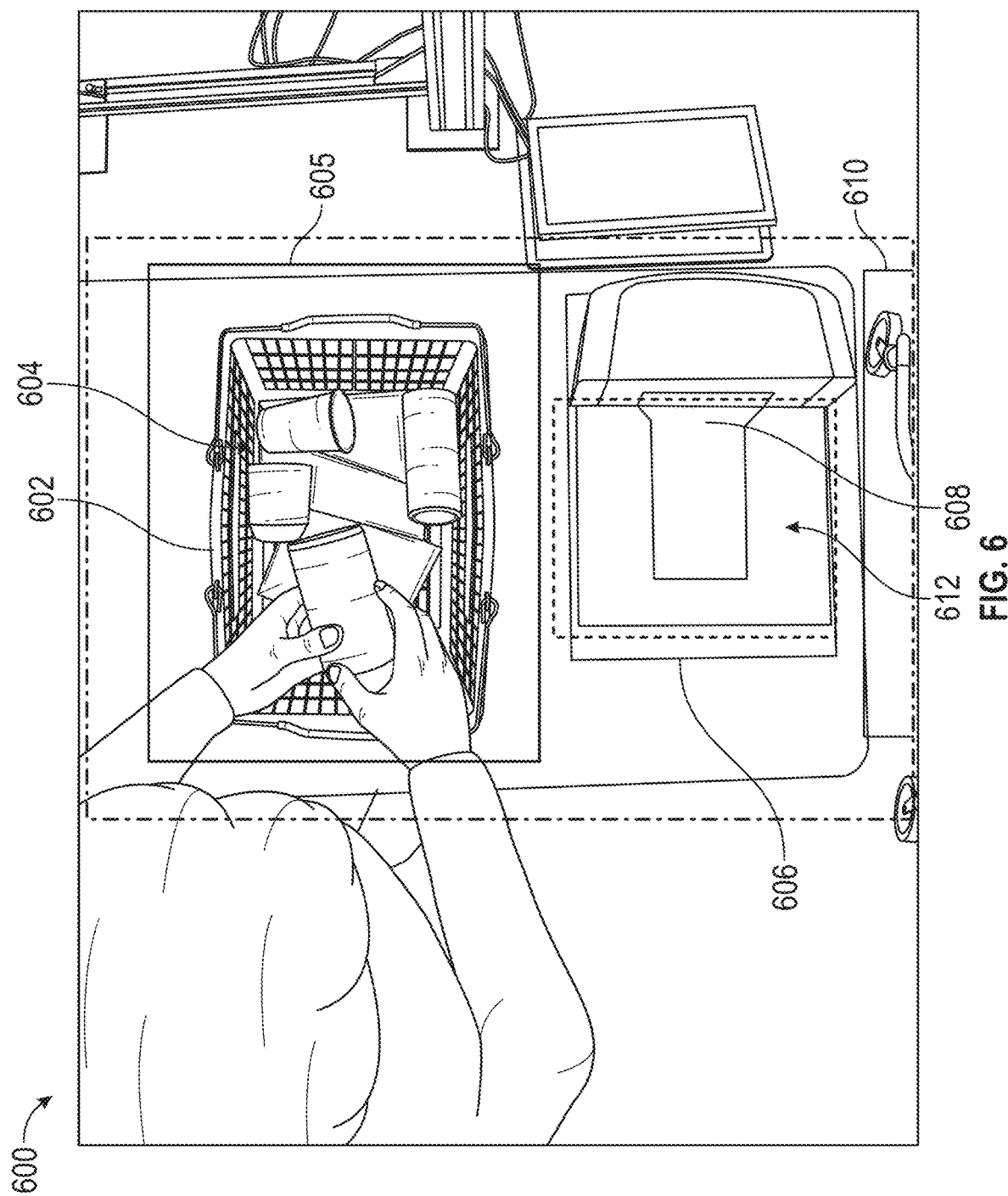

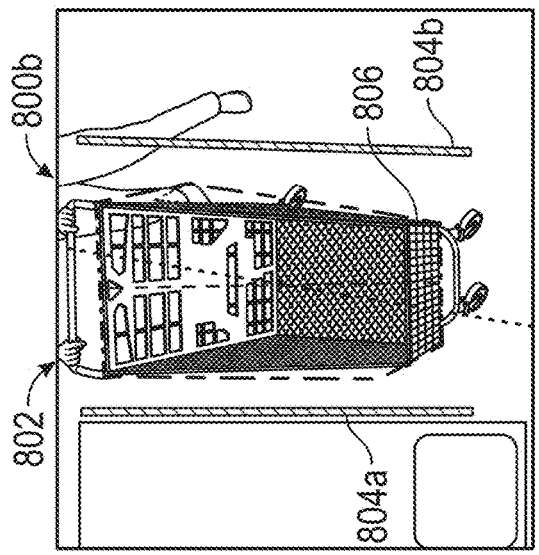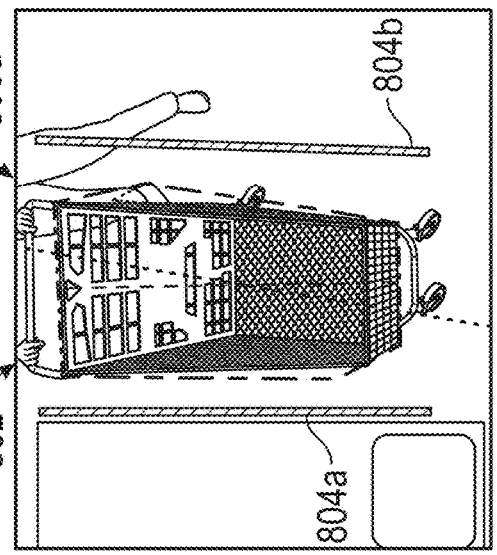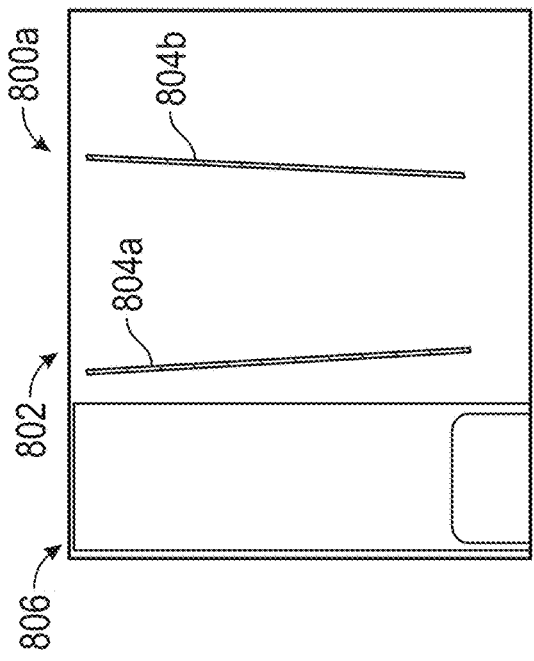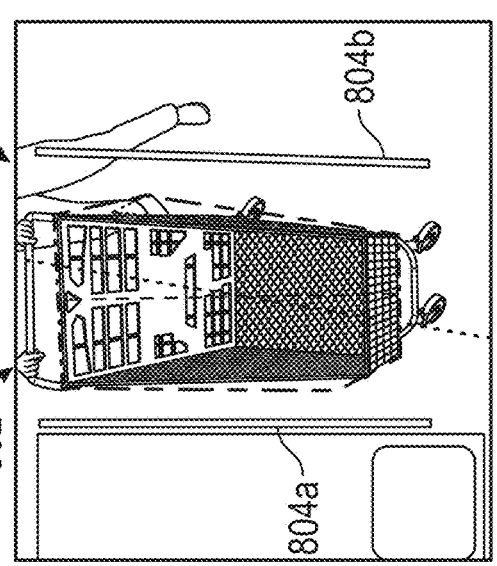

RETAIL STORE SELF-CHECKOUT STATION AND RELATED METHODS FOR PROVIDING INTERACTIVE VIRTUAL LANE FOR SMART SELF-CHECKOUTS

BACKGROUND

Space is at premium in the supermarkets and other retailers, especially around the checkout aisle, where space is often sold by the inch. Stores have a lot more demand for space than is currently available, so saving space dedicated to (self)-checkout operations should result in additional gains due to (a) the possibility to have more self-checkout lines in a given area, and (b) additional space being available to be sold to manufacturers willing to pay for products to be positioned at the checkout stations since every customer needs to pass through the checkout stations.

To reduce space required by the self-checkout stations while maintaining/ensuring easy and flexible operations, it is necessary to minimize cart movements between a cart arriving at a self-checkout station, items being scanned, bill payment, items/bags placed back into the cart, and customer leaving the self-checkout station.

Common/traditional checkout stations usually rely on long lanes with distinct areas/regions set up for: (a) shopping cart arrival and the items scanning phase (input trail), and (b) the bagging area and the new filling of the cart with the items purchased (usually in a region after the scanner, output trail).

Typically, self-checkout stations/kiosks provide a setup or configuration based on separated unload and bagging areas, and, in general, are feasible only for small shopping baskets. For full shopping carts, much more space is needed and little support is given to the customer regarding cart placement and self-checkout scanning procedures. Furthermore, the self-checkout stations include (a) an anti-shoplift feature that is limited to a security scale, and (b) a display-based user interface (e.g., screen) that requires the customer to focus on the display for feedback purposes, thereby making the whole user experience/process not very user friendly. As a result, existing self-checkout processes are neither fraud proof nor user-friendly, which therefore typically requires intervention of specialized personnel. As such, more user-friendly, reliable, smaller, repositionable, and automated fraud-detection solutions of self-checkout stations are needed.

BRIEF SUMMARY

To provide a reduced footprint, user-friendly, dynamically reconfiguration, and reliable/secure self-checkout user-experience, a self-checkout station with both increased flexibility of available space and self-checkout process guidance may be provided by (i) utilizing an overhead or top-down facing camera and smart signs or smart projector, which may also have a top-down orientation, with a system controller capable of providing visual and/or audible guidance to a shopper and (ii) monitoring for fraud. In an embodiment, the self-checkout station may additionally include an electronic display (e.g., screen) may also be utilized to provide feedback to the shopper. Optimizing available space usage may be provided by removing physical barriers and generating an interactive virtual lane for shoppers at the self-checkout station via the overhead camera and smart projector. Optimizing a self-checkout process by the self-checkout station may be provided by monitoring customers in the interactive virtual lane in guiding the customers during an entire self-checkout process, from a customer or shopper arriving at the self-checkout station to completing payment processing and to exiting the self-checkout station.

The interactive virtual lane may be formed by a system inclusive of at least a top-down facing camera and a smart projector that are operated simultaneously by a system controller. The smart projector may be utilized to (i) guide customers to place a cart in a correct location and orientation, and (ii) display warning messages to customers when errors or fraudulent behaviors are detected by the system. The top-down camera (and supporting image processing system that may be part of the system controller) may be configured to check that the customer places the shopping cart in the correct position and orientation (e.g., cart fully within the virtual lane) to allow easy analysis of items in the cart and to maximize space usage at the self-checkout station.

A self-checkout surveillance system (overhead camera with image processing system that processes images and/or video stream during a customer checkout process) allows for a very flexible approach that (i) provides a dynamically reconfigurable work area, (ii) guides and provides feedback to customers during an entire checkout process by dynamically projecting virtual signs or indicators, (iii) estimates cart orientation to interact with customers and make sure carts are aligned correctly in order to assist the surveillance system to have the best possible view to reliably check content in the carts. Based on a configuration of the self-checkout surveillance system in physical connection to a structure that forms a self-checkout station, the self-checkout station may easily be repositioned without having to modify store infrastructure or significantly reduce modification of the store infrastructure.

One embodiment of a retail store self-checkout area may include a scanner configured to enable a shopper to scan items being purchased. A bagging area may be positioned at the scanner. A top-down facing camera positioned and oriented to image a shopping cart or basket at the self-checkout area and to generate image signals of the shopping cart or basket. A projector may be configured to project dynamically alterable illumination signals onto a surface visible to the shopper when at the self-checkout area to provide visual guidance information to the shopper. The projector may be a smart projector, and may be configured to be a top-down facing projector to illuminate a floor at the self-checkout area.

One embodiment of a method of managing a retail store self-checkout area may include receiving image signals from a top-down facing camera. The image signals may be processed to determine whether the shopping cart or basket of the shopper is properly positioned and oriented at the self-checkout area. Responsive to determining that the shopping cart or basket is not properly positioned at the self-checkout area, a control signal may be communicated to the projector to change an illumination signal from a first illumination state to a second illumination state to notify the shopper at the self-checkout area to reposition or reorient the shopping cart or basket.

One embodiment of a method of managing a retail store self-checkout area may include providing a scanner configured to enable a shopper to scan items being purchased. A bagging area positioned at the scanner may be provided. A top-down facing camera may be positioned and oriented to image a shopping cart or basket at the self-checkout area and to generate image signals of the shopping cart or basket. A projector may be positioned and configured to project dynamically alterable illumination signals onto a surface visible to the shopper when at the self-checkout area to provide visual guidance information to the shopper.

BRIEF DESCRIPTION OF THE DRAWINGS

Illustrative embodiments of the present invention are described in detail below with reference to the attached drawing figures, which are incorporated by reference herein and wherein:

FIGS. 3A and 3B are illustrations of an illustrative system controller and modules for monitoring and controlling a self-checkout process of a self-checkout station of a retailer;

FIG. 6 is an illustration of an illustrative scene captured by an overhead camera of a shopping basket to identify items within and/or exiting the basket and monitor accurate scanning and proper behavior of a shopper during a self-checkout process;

FIGS. 8A-8E are images of an illustrative set of scenes of a virtual lane at a self-checkout area along with different guidance or instruction signals produced by a top-down projector by changing colors or patterns of projected lines that define the virtual lane and/or displaying words and/or symbols at the virtual lane in accordance with a state machine.

DETAILED DESCRIPTION OF THE DRAWINGS

Space is at a premium in supermarkets, especially at a checkout area. Self-checkout usability and reliability is highly desired by retailers. To further reduce space to enable more self-checkout stations to be positioned in a given area while maintaining flexible and reliable operations, there is a need to (i) minimize shopping cart movements between the cart arrival, items scanning, bill payment, items/bags placed back into the cart, and customer leaving the area, and (ii) improve the man-machine interface for self-checkout stations.

The principles described herein provide for providing a way to improve communications via a virtual user interface between the machine and the customer by (a) providing a dynamically reconfigurable self-checkout station, (b) providing sensing, scene interpretation, and feedback capabilities to guide the user/customer during an entire self-checkout process through dynamically projected virtual signs and/or illumination markers or lines that define a virtual lane at the self-checkout station, (c) providing a fraud proof or prevention system, and (d) estimating cart orientation to interact with the customer to ensure the cart is correctly positioned and aligned in order to assist a self-checkout system controller in having best possible view to reliably check the cart content.

In providing the above-features, a virtual self-checkout interface may be provided to (i) support and supervise space constrained self-checkout applications, (ii) provide a guided, seamless, user-friendly experience that at the same time supports a fraud proof or fraud prevention self-checkout system in performing customer transactions. The self-checkout station may include a number of components, including (i) a top-down facing camera (sensing device), (ii) a smart sign projector (actuator device), (iii) a processor as part of a system controller configured to interpret an image stream of the self-checkout station, and (iv) a state machine being executed by the processor and used (a) to track customers during a self-checkout process (e.g., cart arrival, guided correct placement, and verification support, items scanning, items bagging, customer payment, and cart departure), and (b) to provide visual feedback and/or guidance to shoppers during the self-checkout process.

Figure 1:
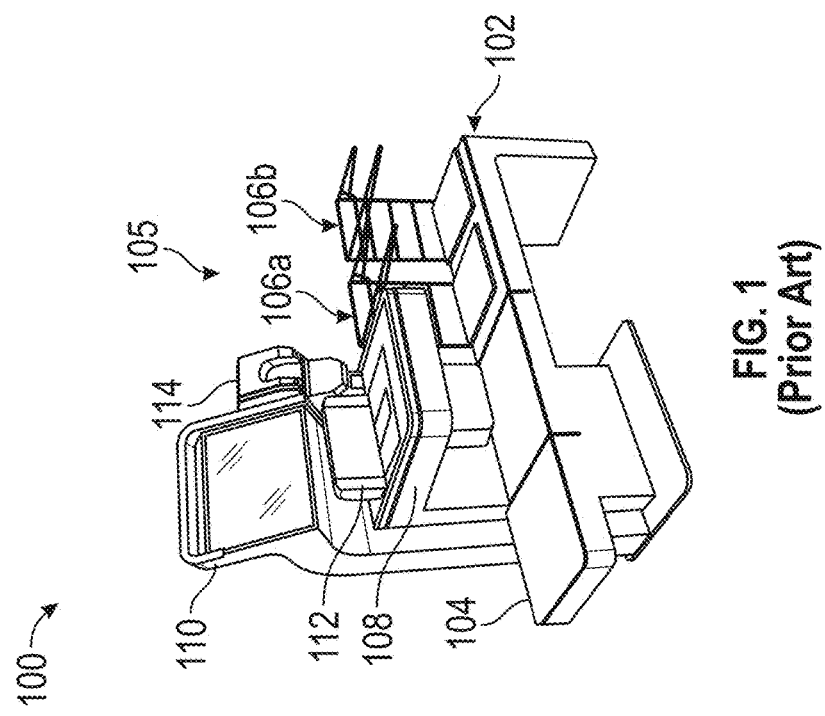
FIG. 1 is an illustration of an illustrative conventional self-checkout station.

With regard to FIG. 1, an illustration of an illustrative conventional self-checkout station 100 is shown. The self-checkout station 100 typically includes a self-checkout structure or counter 102 including a shopping basket support region 104, bagging area 105 with a pair of bagging structures 106a and 106b. A scanning region 107 includes a scanning shelf 108 at which an electronic display 110, which may be a touch screen display, imaging window(s) 112 facing toward a customer and/or upwards from the scanning shelf 108, and payment device 114. The payment device 114 typically includes a card reader, automatic cash receiver and processor, mobile device communicator, and/or any other device that supports collection of payment from a customer performing a self-checkout of goods at a retail store. This particular configuration of the self-checkout station 100 is relatively small compared with other conventional self-checkout stations. It should be understood that this self-checkout station 100 along with others generally have physical barriers in the form of walls, rails, etc., which takes up additional space that could otherwise be used for placement of valuable goods for sale, including ones that consumer product goods (CPGs) companies are willing to pay premium prices to be physically positioned at the point-of-sale (POS). In some cases, security cameras are fixedly positioned on the ceiling or on other physical structures and face the POS, but these security cameras are generally not usable for individual checkout transactions. The physical barriers, in whatever form, tend to be large and bulky. Moreover, the self-checkout station 100 along with physical barriers and fixed security cameras are generally in fixedly positions at the retail store so as to require reconstruction in order to move or rearrange the self-checkout stations 100.

To optimize usage of available space at a retailer self-checkout area, a flexible, dynamically reconfigurable approach that makes it possible to reuse the same space/area for different operations at different times is needed and desirable. As such, it would be of great help to have a self-checkout station capable of simultaneously saving space, supporting security monitoring, and guiding or instructing customers during the self-checkout process, as described hereinbelow.

Figure 2:
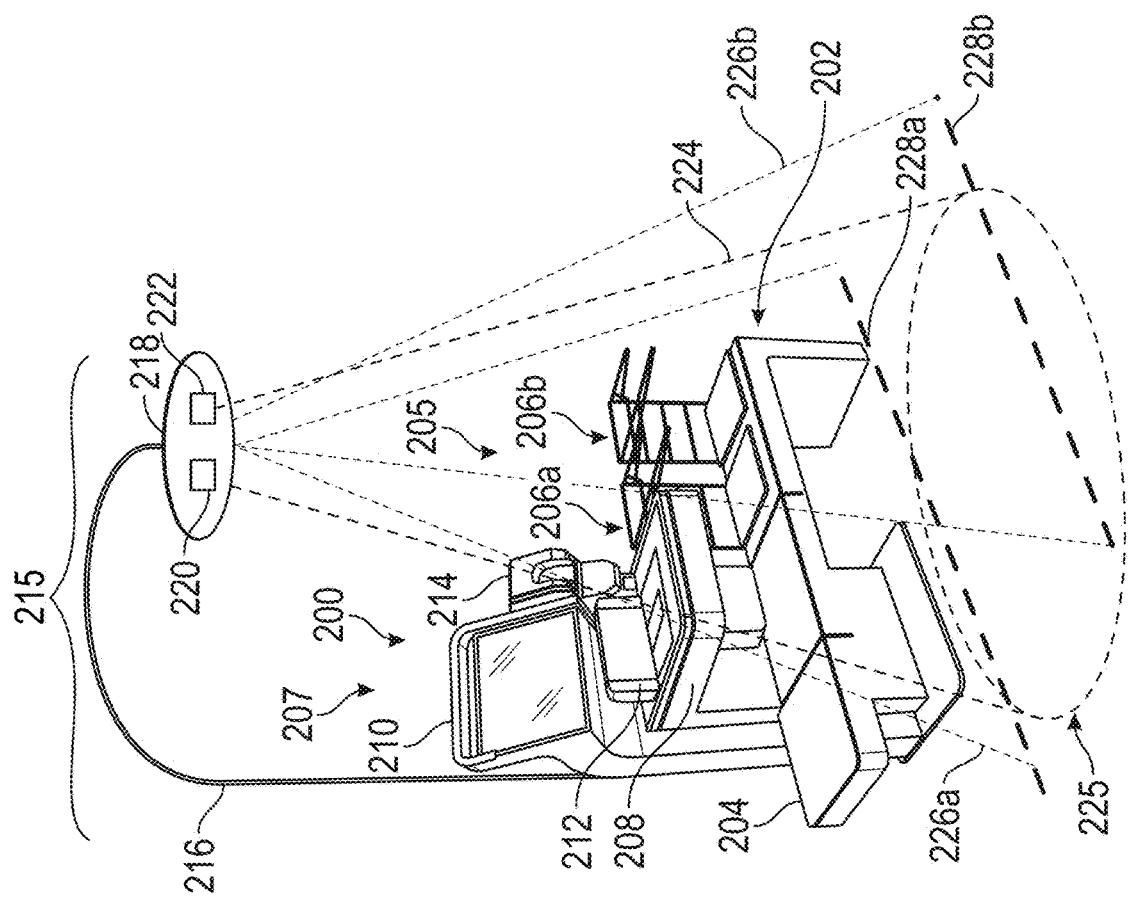
FIG. 2 is an illustration of an illustrative self-checkout station alternatively configured with a smaller footprint and with a top-down camera and virtual lane illumination device or smart signs projector to project virtual lane marker(s) and self-checkout process guidance signals.

With regard to FIG. 2, an illustration of an illustrative self-checkout station 200 that is dynamically reconfigurable and that is capable of having a smaller footprint without physical barriers due to supporting a virtual lane for shoppers is shown. The self-checkout station 200 may be configured with a top-down or overhead camera and smart sign projector to project virtual lane marker(s) to be parallel to a front wall of the self-checkout station 200 and self-checkout process notification signals. The self-checkout station 200 may include a self-checkout structure or counter 202, a shopping basket support region 204, a bagging area 205 with a pair of bagging structures 206a and 206b. A scanning region 207 may include a scanning shelf 208 at which an electronic display 210 (e.g., touch screen display), imaging window(s) 212 facing toward a customer and/or upwards from the scanning shelf 208, and payment device 214 are located. The payment device 214 typically includes a card reader, automatic cash receiver and processor, mobile device communicator, and/or any other device that supports collection of payment from a customer performing a self-checkout of goods at a retail store.

The self-checkout station 200 may be part of a self-checkout area 215 inclusive of the station 200 and area immediately surrounding the self-checkout station 200. The self-checkout area 215 may be defined to include a support structure 216, in this case an arm that extends from the self-checkout station 200 and above the self-checkout station 200 and/or region in front of and aligned with the self-checkout station 200. The support structure 216 may support a housing 218 configured to support top-down camera 220 and smart projector 222. In an embodiment, electrical conductors (not shown) may extend through the support structure 216 to conduct electrical power and data (e.g., Power over Ethernet (PoE), USB cables, etc.) thereto. In an alternative embodiment, the electrical conductors may conduct only electrical signals and data signals may be communicated wirelessly. The smart projector 222 may alternatively be a projector that receives signals or images from a remote processor to be displayed.

The self-checkout area generally includes any area covered by a fields-of-view of the overhead camera and projector. Rather than the self-checkout station 200 including the support structure 216, an alternative embodiment may include mounting the overhead camera 220 and smart projector 222 to any other configuration of support structure 216 supported by a structure of within the self-checkout area 215 so as to enable the camera 220 and projector 222 to provide the same function as shown and described herein. In an alternative embodiment, the support structure 216 may be positioned to a structure of the store. For example, overhead rails and or arms that are dynamically adjustable enable the housing 218 to be moved without having to perform structural changes, thereby making changes to the self-checkout area 215 dynamically repositionable with minimal effort and reconstruction.

The self-checkout station 200 may be configured with a system controller, including a processor and other components, such as shown in FIG. 3A. The system controller may be configured to control operation of the overhead camera 220 and smart projector 222, and may be configured to monitor shoppers and provide guidance to shoppers during a self-checkout process while purchasing goods at the self-checkout area 215. The overhead camera 220 may capture images (e.g., video) within a field-of-view 224 with a virtual lane 225 created by the smart projector 222 that is oriented as a top-down projector and outputs illumination signals 226a and 226b to create projected lines 228a and 228b on the floor. In an alternative embodiment, rather than projecting lights, controllable light strips that are temporarily positioned may be disposed on the floor that define the lane 225, where the strips may include LEDs or other illumination devices, but are capable of being stepped or otherwise impacted without breaking. Control signals may be communicated to the light strips to control color or otherwise.

With regard to FIGS. 3A and 3B, an illustrative system controller 300 including a processor 302 that executes software 304 for monitoring and controlling a self-checkout process of a retailer is shown. The processor 302 may be in communication with an input/output (I/O) unit 306, memory 308, and storage unit 310, such as a disk drive or other non-transitory medium. The I/O unit 306 may be configured to communicate data locally or remotely from the system controller 300. The storage unit 310 may be configured to store a database inclusive of data records 312a-312n (collectively 312), such as product codes, product shapes and colors, shopping cart and shopping basket shapes and colors, etc. The controller 300 may be configured to perform processing for managing the self-checkout process for customers by communicating with an overhead camera 314 and smart projector 316 (e.g., smart signs projector). In communicating with the overhead camera 314, the processor 302 may generate and communicate control signals (not shown) with the overhead camera 314 and receive images 318 using a data packet protocol or other communications protocol via a data communications channel 320 (e.g., wireline and/or wireless communications channel).

In communicating with the smart projector 316, the processor 302 may generate control signals 322 and communicate the control signals 322 via communications channel 323 to cause the projector 316 to display information illumination signals for the shoppers based on a step in the checkout process (e.g., establish lines of virtual lane, scanning products, payment, payment acceptance, self-checkout complete notification) that each shopper performs, as further described herein. Communications of the video stream 318 and/or control signals 322 may be generated by the processor 302 or a signal generator (not shown) with which the processor 302 is in communication via the I/O unit 306. The I/O unit 306 may further be configured to communicate over a local area network (LAN), wide area network (WAN), and/or any other communications network (e.g., Bluetooth®) using any communications protocol for the respective networks, as understood in the art. The system controller 300 may be configured as part of the point-of-sale or may be independent thereof.

The software 304 may include a cart pose analyzer 324 and smart signs projector controller 326 used to create a user interface (e.g., illumination signals that create words, symbols, colors, etc. that guide a user during a self-checkout process). The cart pose analyzer 324 may be configured to identify that a shopping cart is positioned at the self-checkout area (e.g., in front of the self-checkout structure 202 of FIG. 2). The cart pose analyzer 324 may use image processing and object identification technologies, such as a neural network or any other object identification tool or algorithm, to process images of a scene at the self-checkout area. The cart pose analyzer 324 may identify that a shopping cart is positioned at the self-checkout area, but further identify the orientation of the shopping cart. The cart pose analyzer 324 may further determine that the shopping cart is positioned in the correct location (e.g., in front of the self-checkout structure), but in an incorrect orientation (e.g., perpendicular or at a non-parallel angle with respect to the self-checkout structure) such that a portion of the shopping cart is outside one or more projected lines on a floor as illuminated by the smart projector 316 that defines a virtual lane at the self-checkout area.

Figure 4:
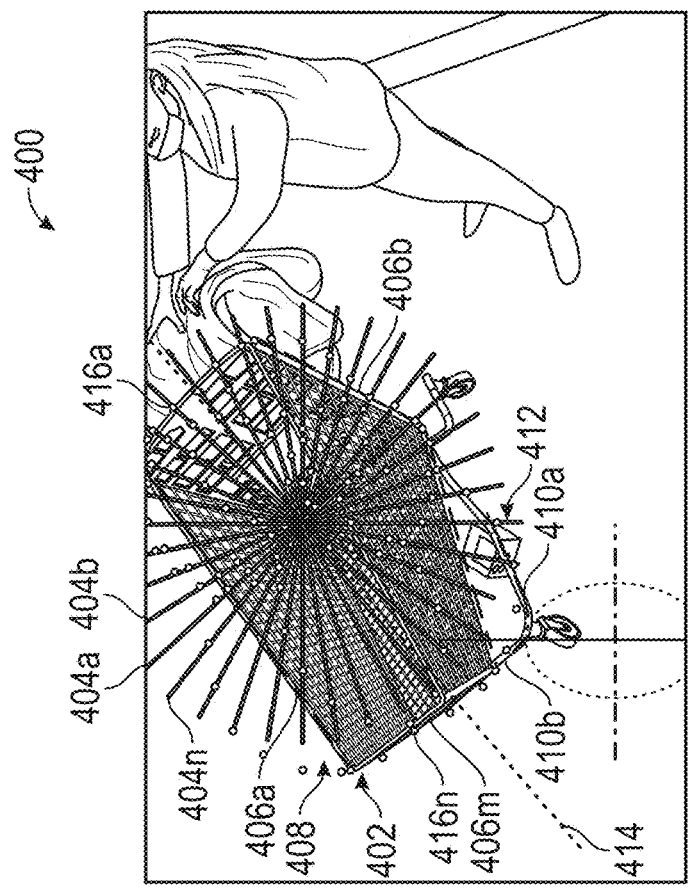
FIG. 4 is an illustration of illustrative scene in which an empty shopping cart may be imaged at an angle to model and train an imaging system to recognize and locate, segment, and estimate a shopping cart in the scene.

More specifically, the cart pose analyzer 324 may be configured to analyze, verify, and guide the customer or shopper to place the shopping cart in the correct position and orientation into a "virtual parking area" at the self-checkout area. To guide the shopper, the system controller 300 is to be trained so that the system has "cognitive ability" to learn and "understand" the scene captured by the overhead camera 314, thereby enabling the system (e.g., cart pose analyzer 324 and/or other modules) to locate, segment, and estimate a pose of a shopping cart in the scene during operation. To train the system controller 300, an appropriate processing pipeline that, in receiving the video stream 318 from the top-down or overhead camera 314, the system controller 300 is capable of estimating the cart pose, as follows:

Shopping Cart Segmentation: to recognize a shopping cart or basket, a "color+contours model" segmentation approach may be utilized, which is based on a classical schema with two phases, training and runtime, as follows:
  (i) Training Phase: a shopping cart "color+contours" reference model may be trained by presenting mages to the model in different orientations, thereby enabling the system controller to recognize a shopping cart when imaged by the overhead camera 314;
  (ii) Runtime Phase:
  (a) Identify probable shopping cart regions by applying a multidimensional thresholding segmentation approach;
  (b) Analyze the probable shopping cart regions using a connected components classification stage to validate the true positives and reject false positives;
  (c) Given the validated shopping cart regions (e.g., only one in the specific case shown in FIG. 4), compute the region convex hull and, leveraging the knowledge that the back side of the shopping cart is generally wider than the front side, "searching by projecting" for a line passing through the convex hull barycenter or center of mass. The line cuts in half the convex hull and produces the smallest convex hull projection extent (NOTE: the max extent happens on the shopping cart diagonals); and
  (d) With further regard to FIG. 4, given the approximate minimum extent projection orientation (e.g., a coarse to fine refinement stage may be used if necessary), a determination may be made of the main direction (back to front) of the shopping cart being perpendicular to the projection orientation.

The user interface smart signs projector controller 326 may be configured to control operation (e.g., light projection, color of light being projected, etc.) of the smart projector 316 as a function of a number of possible inputs, such as an input from the cart pose analyzer 324 indicating that a shopping cart is not oriented properly at the self-checkout area, that the customer made a mistake (e.g., forgot to bag an item), or that the customer's behavior is improper (e.g., did not scan a product prior to placing the product in a shopping bag).

As further shown in FIG. 3B, a number of modules 327, which may be hardware, software, or a combination thereof, that are in communication with the cart pose analyzer 324 and user interface smart signs projector controller 326. A self-checkout process inference/supervisor module 328 may be configured with a state machine 330. The state machine 330 may be embedded within the module 328 or be independent of the module 328 and communicate or share data signals and/or command signals therewith. In sharing the data signals and/or command signals, states of a self-checkout may be stored in shared memory, for example, in the memory 308 of FIG. 3A. In an embodiment, the data signals and/or command signals may include alphanumeric data that may be communicated to the smart projector 316 by the projector controller 326 to cause the smart projector 316 to display preset patterns (e.g., lane lines, words, etc.), colors, etc. stored thereby.

In an embodiment, the smart projector 316 may store preset graphics and patterns (e.g., lane lines, words, etc.), colors, dynamic graphics (e.g., flashing, motion, etc.), and/or other preset graphics and patterns such that receipt of a control signal (e.g., "lane lines; green; solid," "lane lines; yellow; solid, "lane lines; red; solid," lane lines; red; flash;" "Put Cart Here; gray; solid," etc.), the smart projector 316 may access the stored control signal to cause the smart projector 316 to project the commanded illumination signal(s). It should be understood that alternative control signals in any format (e.g., any alphanumeric representation of a command) may be utilized. A set of control signals may be stored in the memory 308 and/or data records 312 along with identifications of a state of self-checkout of a shopper by the state machine 330 may cause the smart sign projector controller 326 to access the associated command and communicate the control signals 322 to cause the projector 316 to display the appropriate guidance information for the shopper.

The state machine 330 may be configured to track a self-checkout operations process, including identification of shopping cart or basket arrival, correct placement and verification of carts and baskets, items scanning, items bagging, customer payment, and customer departure. In the event that the shopper exits the self-checkout process prior to payment completion or performs steps out-of-order, the state machine 330 may be configured to generate notifications to the shopper and/or reset for a next customer based on a number of exception protocols. It should be understood that the state machine may be one or more modules and may be integrated with other functions of the software 304.

The modules 327 may further include a basket/cart content analyzer module 332 configured to analyze and identify goods that are contained in baskets and carts as the shopper is performing the self-checkout process. For example, the basket/cart content analyzer module 322 may be configured to identify items based on size, shape, color, label, etc., of the items or portion of the items and generate an item identifier 334. Additionally, if the content analyzer module 332 includes an estimator (e.g., Kalman filter, neural network, etc.), then the content analyzer module 332 may additional communicate an estimate certainty percentage (e.g., 87%) indicative that the content analyzer module 332 has correctly identified the object. The module 332 may utilize images collected by the camera 314 in the form of video or still images. In an embodiment, if the system controller 300 is in communication with a scale at the self-checkout station, then weight information may be utilized by the content analyzer module 332 for each item that is weighed by the scale by itself or added to the scale other items of known weight. The state machine 330 may receive the item identifier 334 and use the information to determine that the shopper is currently performing a self-checkout at the self-checkout area.

A customer behavior tracking/analyzer module 336 may be configured to monitor customer behavior at the self-checkout station. For example, the module 336 may track that an item is taken out of a shopping cart or basket and scanned prior to being placed into a bagging area. As another example, the module 336 may track that the shopper takes all of the items out of the cart or basket and places the items into the bagging area (or back onto the cart in the event that the items are too large to be bagged). It should be understood that there are a number of different customer behavior scenarios that may be monitored utilizing the configuration of the self-checkout station. The module 336 may also use images generated by the camera 314 in the form of video and/or still images to perform the behavior tracking and analyzing of a customer as he or she is performing a self-checkout. In an embodiment, error and fraud identifiers may be stored in the memory 308 and/or data records 312 such that if the module 336 identifies a known customer error or fraud behavior, the module 336 or state machine 330 may provide an identifier of the known customer error or fraud behavior, and such an identifier may be looked up in the memory 308 or data records 312 to look up an associated control signal. In response, the smart signs projector controller 326 may communicate the associated control signal 322 to the smart projector 316 to display the commanded illumination signals to display guidance information to the shopper.

A behavior identifier 338 may be generated by the customer behavior tracking/analyzer module 336 and communicated to the self-checkout process inference/supervisor module 328 and/or state machine 330 to determine that the customer is still in a scanning process or state, payment process, or any other process for which the module is capable of monitoring. The behavior identifier 338 may be used by the module 328 and/or state machine 330 to determine (i) a current state in the self-checkout process that a customer is performing, and (ii) a notification that the customer either has proper or improper behavior. In the event that the customer is determined to have either proper or improper behavior, a signal may be generated and communicated to the user interface smart signs projector controller 326 to cause an illumination signal to be output by the projector 316 to have a particular output (e.g., shape, color, etc.). The module 328 and/or state machine 330 may simply respond to a behavior identifier representative of improper behavior and otherwise handle typical guidance based on determine state in performing the self-checkout. In an embodiment, the controller 326 may further be in communication with an audible controller (not shown) to cause a speaker (not shown) to output an audible signal (e.g., tone, frequency, spoken words) to notify the shopper of performing proper or improper behavior, for example. It should be understood that the controller 326 may be configured to support only a visual display (e.g., using a top-down smart projector), only an audible output (e.g., using a speaker at the self-checkout station to output audible words and/or sounds), or both visual and audible machine-human interfaces. In yet another embodiment, an electronic display and audible output may be utilized to support the self-checkout station with the top-down camera. With any of the configurations of the self-checkout station, the modules (e.g., module 328 and/or state machine 330) may operate in real-time such that the notifications smart signs projector controller 326 communicates notifications are dynamic to provide feedback, instructions, or other notifications to the shoppers in real-time. An illustrative process of the state machine 330 is provided with regard to FIGS. 8A-8E hereinbelow.

A barcode reading items analysis module 340 may be configured to image and decode a machine-readable identifier (e.g., barcode, quick reference (QR) code, etc.) that is on items being purchased by a shopper. The module 340 may further be configured to read words on labels, capture data on a near field communication (NFC) tag, or capture machine-readable indicia of an item using any other protocol. The module may generate an item code 342 and communicate the code 342 to the module 328 and/or state machine 330 for processing thereby. The module 328 and/or state machine 330 may, in response, communicate checkout information 344 to the controller 326 so as to control information being dynamically communicated to the shopper in real-time via illumination signals from the projector 316 (and/or audible signals via a speaker) during the self-checkout process. The checkout information 344 may further be used by the controller 326 to display checkout status information to the shopper on a conventional display or any other technique. A speaker 346 may be in electrical communication with the system controller 300 and be configured to generate audible output in response to receiving audible signals 348 via a communications channel 350. In an embodiment, the speaker 346 may be a smart speaker and be configured with stored audible information to play in response to receiving a command (as opposed to audible signals 348). The audible signals 348 may be conventional audible signals that are stored in the data records 312 as wave files or other format and may be digital or analog.

With regard to FIG. 4, an illustration of illustrative scene 400 in which an empty shopping cart 402 may be imaged at an angle to train an imaging system to recognize and locate, segment, and estimate a shopping cart in the scene 400. The projection operation basic schema is shown, where lines 404a-404n (collectively 404) highlight projection directions made by the system (e.g., cart pose analyzer 324 of FIG. 3B) while searching for the main direction/orientation of the shopping cart 402. Lines 406a-406m (collectively 406) may be placed on edges of a basket 408 of the shopping cart 402. Lines 410a and 410b (collectively 410) may be placed on structures that form a base 412 of the shopping cart 402. As previously described, a line 414 may extend through a center of mass point defined by the shopping cart 402 (or other geometric point relative to the structure of the shopping crat 402). Points 416a-416n (collectively 416) may be positioned on the lines 406 and used by the cart pose analyzer 324. The lines 404, 406, and 410 may be used to create a model of segments of the shopping cart 402. Alternative modeling techniques may be utilized to model the shape and/or orientation of the shopping cart 402.

Figure 5:
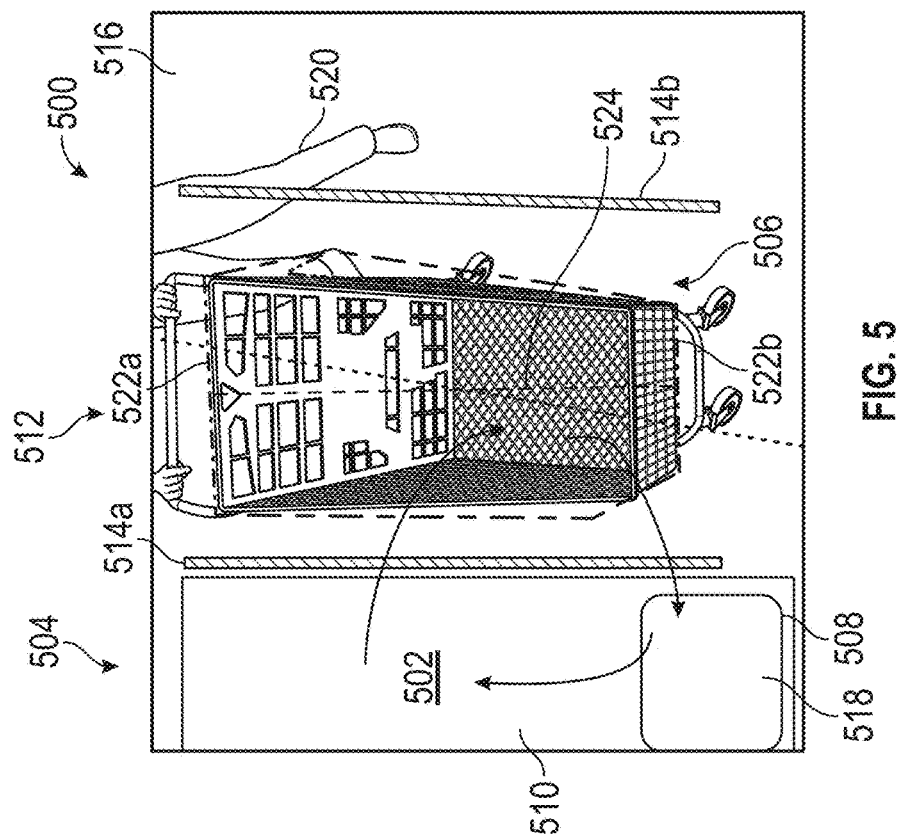
FIG. 5 is an illustration of an illustrative scene in which a bagging area of a self-checkout area with a shopping cart positioned in parallel and within a virtual checkout lane bounded by projected illumination signals that form lines that define the virtual lane.

With regard to FIG. 5, an illustration of an illustrative scene 500 in which a bagging area 502 of a self-checkout area 504 with a shopping cart 506 positioned in parallel with a front edge 508 of a structure 510 and within a virtual checkout lane 512 bounded by projected illumination signals that form lines 514a and 514b (collectively 514) projected onto a floor 516 is shown. A scanning system or scanner 518 is positioned on the structure 510 for a shopper 520 to use in performing a self-checkout. The scanner 518 is configured to scan machine-readable indicia on items being purchased to automatically determine identity of the items, as understood in the art. The trained system controller may identify various rear and front features of the shopping cart 506 and create lines 522a and 522b (collectively 522), for example, to create a perpendicular line 524 that extends longitudinally through the cart 506 to determine orientation. As represented, the lines 522 and 524 are computer model lines and not illuminations on the physical cart. The system controller may be configured to identify the position and orientation of the cart 506 to ensure that the cart 506 remains within the virtual checkout lane 512. It should be understood that alternative modeling and orientation techniques may be utilized.

With regard to FIG. 6, an illustration of an illustrative scene 600 captured by an overhead camera of a shopping basket 602 to identify items 604 within the basket 602 and monitor accurate scanning and proper behavior of a shopper during a self-checkout process is shown. Within the scene 600, the basket 602 is positioned in an item pickup region-of-interest (ROI) 605 from the prospective of the overhead camera, where a customer places the basket 602 during the self-checkout process. The camera is used to capture images of the basket 602 and items 604. A self-checkout surveillance region-of-interest 606 is shown. Also shown are an item scan region-of-interest 608 and bagging area region-of-interest 610 at a bagging area. Each of the regions-of-interest are considered to be segments of the image (e.g., still or video) produced the overhead camera. As understood in the art, a customer removes the items 604 from the basket 602 to be scanned by a scanner 612 within the item scan ROI 608 prior to placing the items 604 into bags in the bagging area.

More specifically, and with further regard to FIGS. 3A and 3B, the self-checkout process inference/supervisor module 328 may function as a self-checkout process virtual lane supervisor module to manage the self-checkout process of a shopper in purchasing items via a self-checkout station. In an embodiment, the entire self-checkout process is based on a basic set of repetitive customer operations and/or actions divided in two main phases:

At Phase 1: A customer enters the self-checkout area and scans all the items inside the shopping cart or basket. As part of the process, the shopper positions the shopping cart in the proposed location (i.e., in front of a scanner region) with the correct orientation (e.g., parallel to a counter). The customer may stand in front of the cart near the scanner and start the items scanning process by picking up one item at a time, scan the item barcode or machine-readable indicia, and place the item in the bagging area.

At Phase 2: After all the items previously in the shopping cart have been scanned and added to a shopping list at a point-of-sale, the shopper pays for the items on the shopping list and leaves the store. Before leaving the store, the shopper puts the shopping bags into the shopping cart and exits the area. These actions can be well modeled and incorporated into the state machine 330 of FIG. 3B. The state machine 330 may be in communication with (i) a sensing and inference engine that is configured to analyze a top-down camera video stream to determine what is happening in the scene, and (ii) a smart projector configured to provide adequate feedback to the customer when positioned at the self-checkout scanning area, as shown in FIG. 5.

Figure 7:
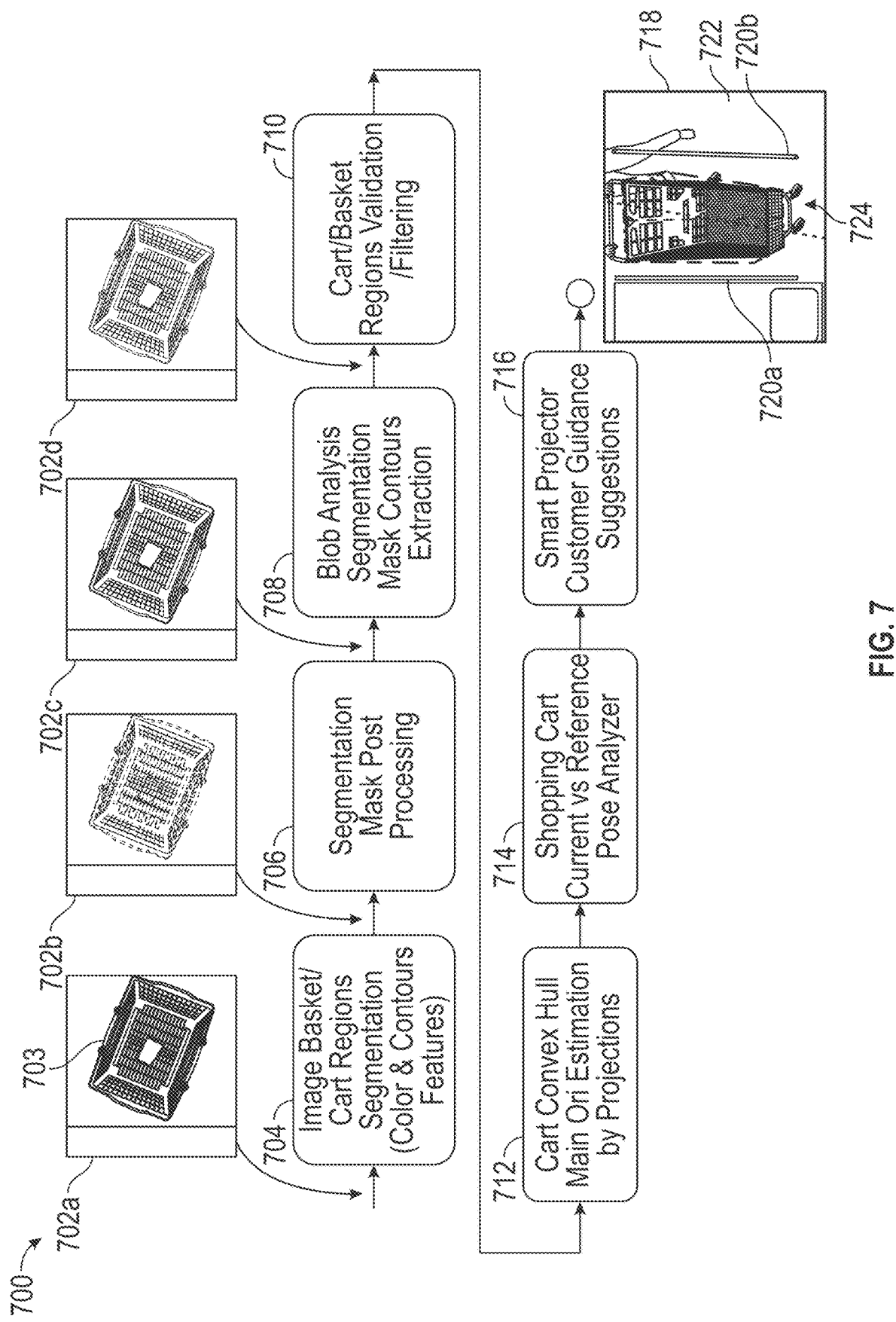
FIG. 7 is a flow diagram of an illustrative process for using image processing in recognizing items and providing instruction signals to a shopper during a self-checkout process.
Figure 8E:
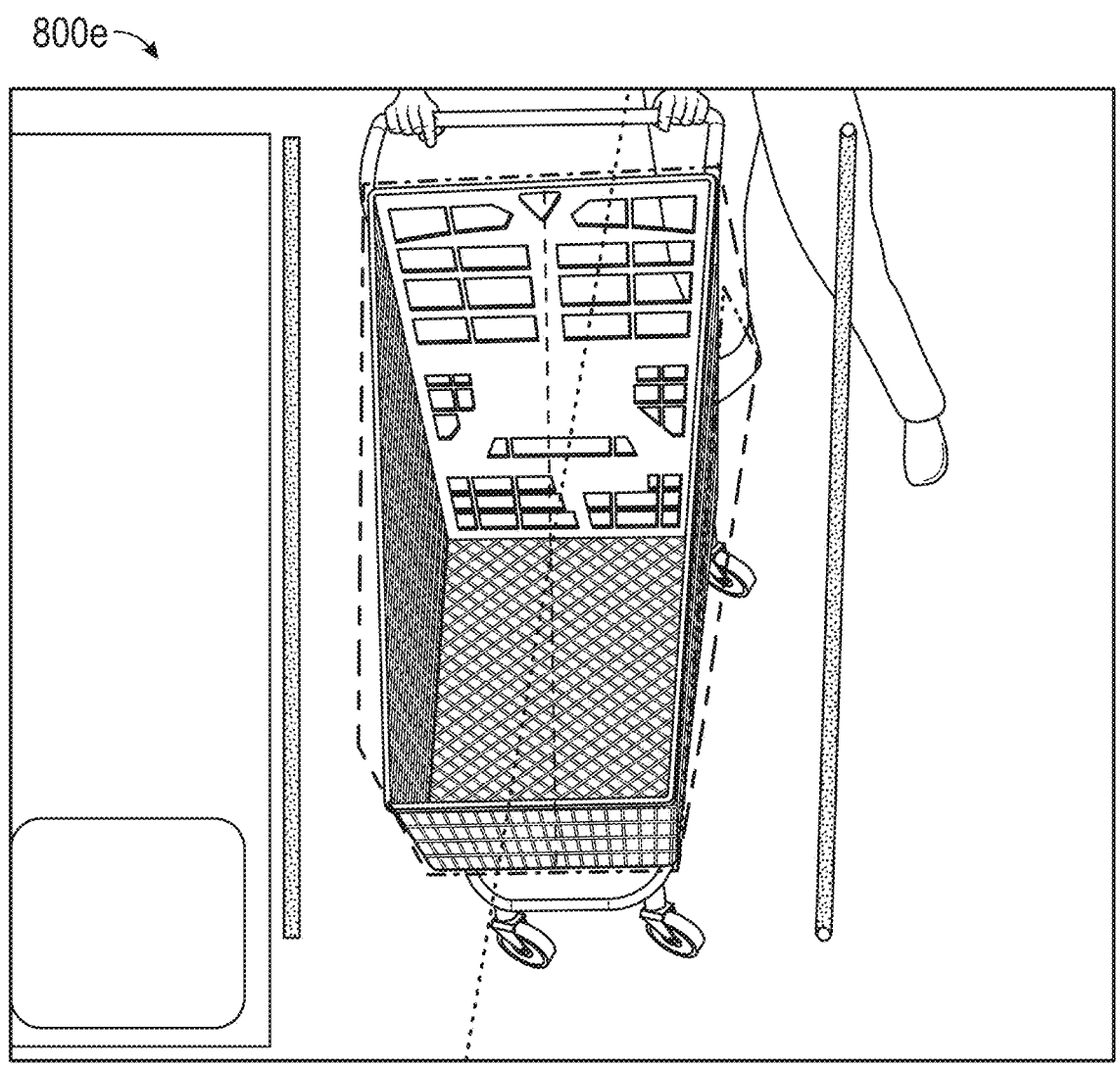
Figure 9A:
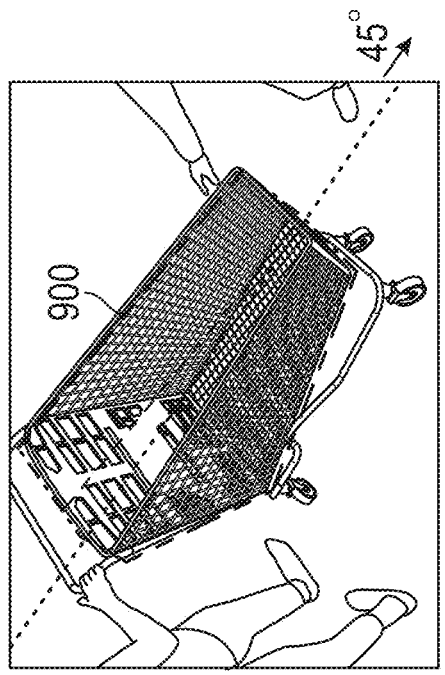
FIGS. 9A-9H are images of an illustrative shopping cart positioned at different angles for training an imaging system to identify or recognize the shopping cart when positioned at a self-checkout area.
Figure 9B:
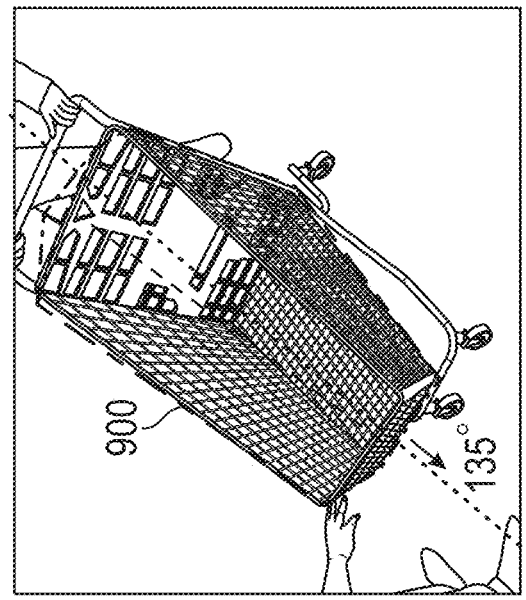
Figure 9C:
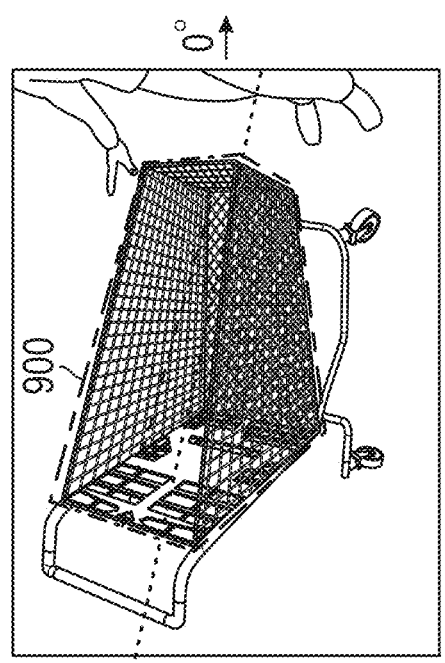
Figure 9D:
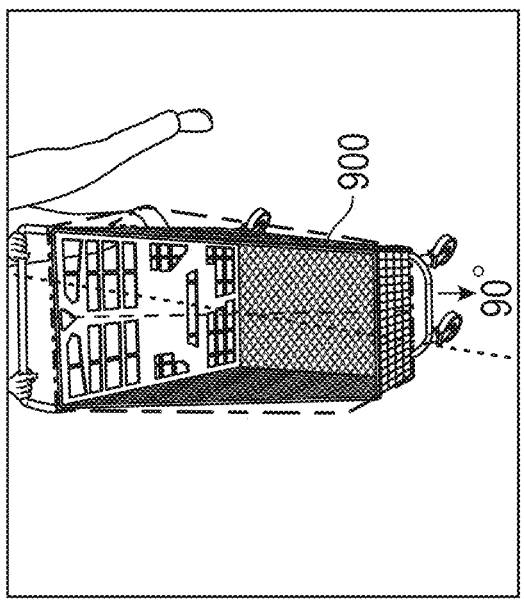
Figure 9F:
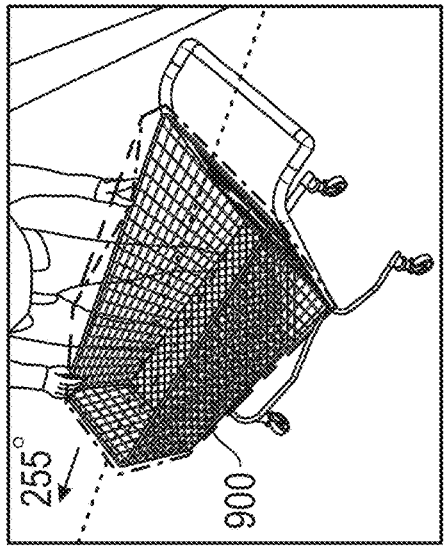
Figure 9H:
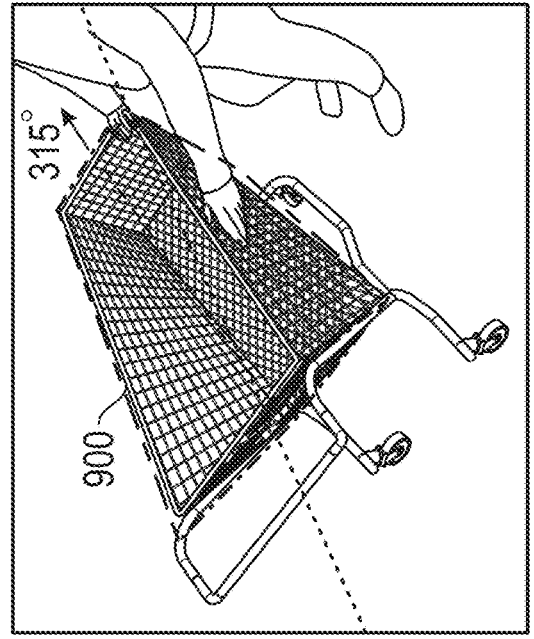
Figure 9E:
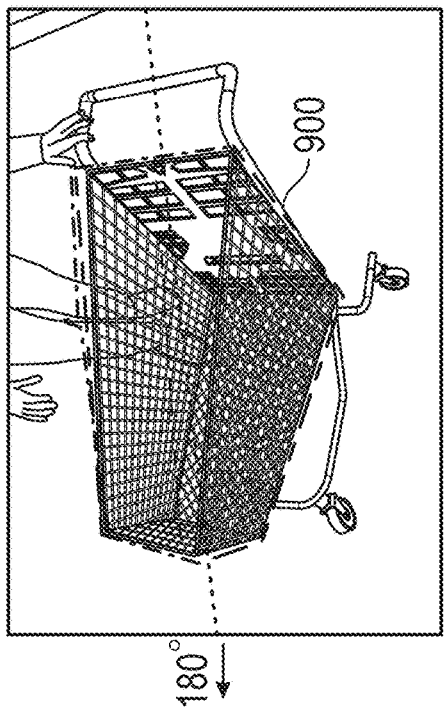
Figure 9G:
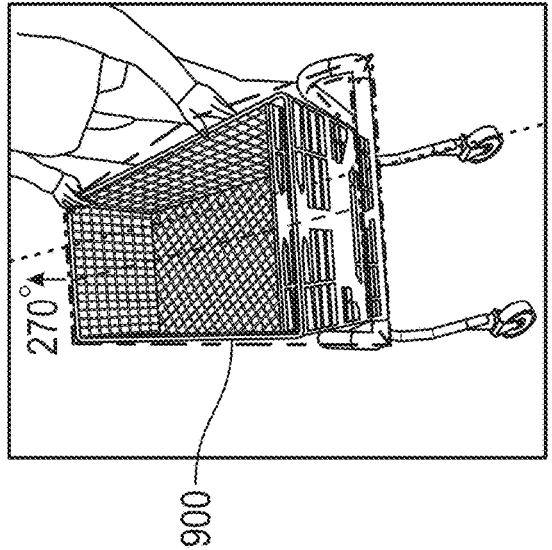

With regard to FIG. 7, a flow diagram of an illustrative self-checkout imaging and guidance process 700 for using image processing in recognizing items in supporting the self-checkout process inference/supervisor module 328 of FIG. 3B and providing instruction signals to a shopper during a self-checkout process is shown. Images 702a-702d (collectively 702) are images generated at different stages of an image processing process that may be performed by the system controller 300 of FIG. 3A executing the software 304 of FIG. 3B. The smart-checkout imaging and guidance process 700 may be performed by imaging both shopping baskets and shopping carts, and may start by receiving image 702a of a shopping basket 703 placed at a self-checkout area generated by an overhead camera, as previously described. The image 702a may be processed at step 704, where an image basket/cart regions segmentation may be performed by identifying color and contours features. The color and contours features may be processed to isolate the basket and items (not shown) contained therein. Other algorithms and imaging techniques may be utilized to identify the shopping basket, cart, and items being purchased. Resulting from step 704 is the image 702b that is then processed at step 706 by performing a segmentation mask post processing operation. Image 702c results from step 706 and a blob analysis segmentation mask contours extraction process is performed at step 708. Image 702d results from step 708 and a cart/basket regions validation/filtering process is performed at step 710.

The process 700 may further be configured to assist in providing guidance to customers with shopping carts with items at the self-checkout station. At step 712, a cart convex hull main orientation estimation using projections may be performed so as to determine orientation of a shopping cart at the self-checkout area. At step 714, a shopping cart current versus reference pose analyzer may be performed to determine position and orientation of the shopping cart imaged by the overhead camera. If orientation of the shopping cart is unacceptable (e.g., outside lines of the virtual lane), then at step 716, a smart projector customer guidance suggestions process may be performed. In performing the customer guidance suggestions, a smart projector at the self-checkout area, as shown in scene 718, may be configured to project illumination signals to form and/or change color, shape, or otherwise of lines 720a and 720b (collectively 720) and/or display other guidance information (e.g., words and symbols) on a floor 722 at the self-checkout area at a virtual lane 724. The smart projector customer guidance suggestions performed at step 716 may use the software 304 of FIG. 3B to assist shoppers in performing self-checkout to purchase items contained in shopping baskets and shopping carts. As previously described, and further described with regard to FIGS. 8A-8E hereinbelow, the smart projector may be configured to provide guidance by dynamically changing color of the lines or perform any other display feature as a function of state of the customer in a self-checkout process.

With regard to FIGS. 8A-8E, images of an illustrative set of scenes 800a-800e (collectively 800) of a virtual lane 802 defined by projected lines 804a and 804b (collectively 804) produced by an smart projector configured as a top-down projector at a self-checkout area 806 along with different guidance or instruction signals produced by the smart projector by optionally changing colors or patterns of the projected lines 804 in accordance with a state machine are shown. In scene 800a, the virtual lane 802 bounded by the projected lines 804 defines where a shopping cart 806, as shown in FIGS. 8B-8E, is shown. The projected lines 804 may be used by a cart orientation estimate algorithm to assist a shopper in maintaining the shopping cart 806 within the virtual lane 802. In an embodiment, a cart orientation estimation module, such as module 322 of FIG. 3B, may be integrated in the system to control and support the correct placement of the shopping cart into the virtual lane. The module/algorithm 322 may be configured to perform the following steps (i) cart (color+contours) segmentation (step 704 of FIG. 7), (ii) contours detection+filtering (steps 706-710), and convex hull analysis (projection of the cart along many different directions) (step 712; see also FIG. 4). To provide an easier and safer point-of-view, the system may guide the customer to orient the cart at a preferred angle (de facto forming a virtual lane) that reduces blockage of self-checkout passages as much as possible, such as when a shopping cart is oriented at a 90 degree or 270 degree angle relative to a counter of the self-checkout area 806, and/or to employ a customized process to analyze shopping cart content based on the detected point-of-view.

Supported with sensing, inference, and signaling capabilities, the self-checkout supervisor module may guide and supervise the customer along the whole self-checkout process while monitoring for errors or fraud actions. The self-checkout process may be accomplished through use of a state machine, such as state machine 330 of FIG. 3, that makes it possible to reuse the same cart parking region for both the process of emptying of the cart of items to be added to a shopping bill and the subsequent filling of the emptied cart or basket with the items purchased in shopping bags or otherwise.

The state machine 330 of FIG. 3B may be used in providing information to a shopper during a self-checkout process in purchasing items at a retail store using a self-checkout station, as shown in FIG. 8A-8E. The state machine 330 may include a number of states and information provided to the shopper may be displayed away from an electronic screen by using a smart projector positioned over the virtual lane 802, where the smart projector may be configured to project words, symbols, lane lines, different colors and/or other illumination techniques (e.g., flash, sequence, etc.) that is visible to the shopper. In an embodiment, audible information may be communicated to the shopper. The state machine provides a shopper with information indicative of a current state and/or transition between states as the shopper perform a self-checkout in purchasing items. An illustrative state machine may include the following states:

State 1 (e.g., gray lights): the self-checkout system is waiting for a new customer to enter the self-checkout region (e.g., projecting "Put Cart Here" information on the floor next to the self-checkout station and optionally within the virtual lane 802). State 1 may be seen in FIG. 8A.

State 2 (e.g., yellow lights): the customer places the cart full of items into a virtual lane defined by projected lines on the floor, and then the lights of the lane lines may turn orange. In an embodiment, State 2 may require or recognize that the shopper places himself or herself in front of the cart or in a location that does not obscure the items within the cart from the overhead camera, and when the user is in front of the cart, the lights turn the lane lines orange or flash the lane lines for a certain period of time. State 2 may be seen in FIG. 8B (although the shopper is not in front of the shopping cart in this image). It should be understood that the colors of the projection lights are arbitrary, and that other colors may be utilized. It should further be understood that alternative illumination techniques of the lines, words, and/or symbols may be utilized.

State 3 (e.g., orange lights): the customer begins to pick up the items to scan barcodes (or other machine-readable indicia) of the items one-by-one and to place the items in the bagging area. This process (and state) lasts until all products in the cart have been removed from the cart and added to the shopping list, after which the lights may turn violet. State 3 may be seen in FIG. 8C.

State 4 (e.g., violet lights): after each of the items is scanned by the point-of-sale (or other single or bulk scanning process), the customer is enabled to proceed with the payment. After successful payment, the lights may turn blue. State 4 may be seen in FIG. 8D.

State 5 (e.g., blue lights): the customer can reload the cart with the purchased items/bags (from the bagging area to the cart) so the user can exit the supermarket. State 5 may be seen in FIG. 8E.

State 6 (e.g., green lights): when the self-checkout, payment, cart reload has been completed, the customer may leave the area and the system may return to state 1. State 6 may also be seen in FIG. 8E.

Error State: in the case where error(s) or misbehavior(s) by the customer are detected, the system may transition into an alarm state (e.g., red lights). Depending on the error or misbehavior, the red lights may be flashed or otherwise. Errors may occur when a user mistakenly places a scanned item back into a cart or elsewhere other than in the bagging area. Misbehavior occurs when a user takes an item out of a shopping cart or basket and does not scan the item before placing the item in the bagging area or elsewhere. Another example of an error or misbehavior is when an item is not removed from the cart or basket before placing scanned items back into the cart It should be understood that there are many other errors and misbehaviors that the system may be trained to identify, and that errors and misbehaviors may be handled differently or the same (e.g., same colors, same colors but illumination effects (e.g., constant color versus flashing color), different colors, flood area with colored light, etc.).

The above self-checkout processing states are illustrative, and it should be understood that additional and/or different self-checkout states may be included. By using a smart projector that projects light lines that define a virtual lane and changing color of the light lines and/or other illumination signals for shoppers to see during different phases of the self-checkout process, the shoppers are provided with a more user-interactive experience not centered around an electronic display at the self-checkout station.

With regard to FIGS. 9A-9H, images of an illustrative shopping cart 900 positioned at different angles 0 degrees to 315 degrees in 45 degree angles for training an imaging system to identify the shopping cart when positioned at a self-checkout area are shown. Additional or fewer angles may be utilized, as well. The imaging system may be trained to recognize the shopping cart at each of the different angles so as to identify that a shopping cart is located within a virtual self-checkout lane. The different angles of the shopping cart may be stored in memory 308 or data records 312 of FIG. 3A and used by the processor 302 in executing the software 304 to support guidance to shoppers during self-checkout at a retail store.

One embodiment of a retail store self-checkout area may include a scanner configured to enable a shopper to scan items being purchased. A bagging area may be positioned at the scanner. A top-down facing camera positioned and oriented to image a shopping cart or basket at the self-checkout area and to generate image signals of the shopping cart or basket. A projector may be configured to project dynamically alterable illumination signals onto a surface visible to the shopper when at the self-checkout area to provide visual guidance information to the shopper.

The self-checkout area may further include a processor configured to receive the image signals from the camera, process the image signals to determine whether the shopping cart or basket of the shopper is properly positioned and oriented at the self-checkout area, and responsive to determining that the shopping cart or basket is not properly positioned at the self-checkout area, cause the projector to change an illumination signal from a first illumination state to a second illumination state to notify the shopper to reposition or reorient the shopping cart or basket. The first illumination state may include a first color and the second illumination state may include a second color.

The processor may further (i) identify an action indicative of an error or misbehavior by the shopper, and responsive to identifying an action indicative of an error or misbehavior, (ii) communicate a control signal to the projector to alter the illumination signal from the first illumination state to a third illumination state. The self-checkout area may further include an audible device configured to output audible signals. The processor may further be configured to generate and communicate audible data to the audible device in response to determining that (i) the shopping cart or basket is not properly positioned and oriented at the self-checkout area or (ii) the shopper made an error or performed an action that appears to be misbehavior.

One embodiment of the self-checkout area may include an electronic display configured to output visible signals. The processor may further be configured to generate and communicate visible data to the electronic display in response to determining that (i) the shopping cart or basket is not properly positioned and oriented at the self-checkout area or (ii) the shopper made an error or performed an action that appears to be misbehavior.

The illumination signals may form at least one elongated virtual lane line substantially parallel with a side wall that at least in part defines the bagging area and/or supports the scanner. The camera and projector may be supported by a structure of the self-checkout area and positioned above an area adjacent to the self-checkout area at which the shopper is to place the shopping cart such that the illumination signals generated by the projector define a virtual lane.

The self-checkout area may further include a processor configured to determine different states of a checkout process performed by shoppers at the self-checkout area, and communicate control signals that cause the projector to alter illumination states of the illumination signals, thereby causing the visual signals to be altered to guide the shopper in performing a self-checkout. The different states of the checkout process may include at least two of the following: (i) waiting for a customer; (ii) a customer placing a shopping cart or basket with one or more items at the self-checkout area; (iii) scanning items using the scanner and placing the scanned items into the bagging area; (iv) enabling the shopper to pay for the scanned item; (v) notifying the customer to remove the items from the bagging area; (vi) completing the self-checkout without detecting an error or misbehavior; and (vii) detecting an error or misbehavior and providing visual feedback via the projector.

One embodiment of a method of managing a retail store self-checkout area may include receiving image signals from a top-down facing camera. The image signals may be processed to determine whether the shopping cart or basket of the shopper is properly positioned and oriented at the self-checkout area. Responsive to determining that the shopping cart or basket is not properly positioned at the self-checkout area, a control signal may be communicated to the projector to change an illumination signal from a first illumination state to a second illumination state to notify the shopper at the self-checkout area to reposition or reorient the shopping cart or basket.

Communicating the control signal to the projector to change from the first illumination state to the second illumination state may include communicating a control signal to the projector to cause the projector to change the illumination signal from a first color to a second color. The process may further identify an action indicative of an error or misbehavior, and responsive to identifying an action indicative of an error or misbehavior, communicate a second control signal to the projector to alter the illumination signal from the first illumination state to a third illumination state.

An audible signal may be generated in response to determining that (i) the shopping cart or basket is not properly positioned and oriented at the self-checkout area or (ii) the shopper made an error or performed an action determined to be misbehavior. Communicating the control signal to the projector may include communicating the control signal to cause the projector to generate at least one elongated virtual lane line substantially parallel with a side wall that at least in part defines a bagging area and/or supports a scanner.

The camera and projector may be supported by a structure of the self-checkout area and positioned above an area adjacent to the self-checkout area at which the shopper is to place the shopping cart such that the illumination signals generated by the projector define a virtual lane. A determination of different states of a checkout process performed by shoppers at the self-checkout area may be performed, and different control signals may be communicated based on the determined state of the checkout process to the projector to alter illumination states of the illumination signals, thereby causing the visual signals to be altered to guide the shopper in performing a self-checkout.

The projector may alter the illumination states based on the different states of the checkout process, where the different states of the checkout process may include at least two of the following: (i) waiting for a customer; (ii) a customer placing a shopping cart or basket with one or more items at the self-checkout area; (iii) scanning items using the scanner and placing the scanned items into the bagging area; (iv) enabling the shopper to pay for the scanned item; (v) notifying the customer to remove the items from the bagging area; (vi) completing the self-checkout without detecting an error or misbehavior; and (vii) detecting an error or misbehavior and providing visual feedback via the projector. A cart orientation estimation module may be executed to identify features of the shopping cart to determine position and orientation thereof.

One embodiment of a method of managing a retail store self-checkout area may include providing a scanner configured to enable a shopper to scan items being purchased. A bagging area positioned at the scanner may be provided. A top-down facing camera may be positioned and oriented to image a shopping cart or basket at the self-checkout area and to generate image signals of the shopping cart or basket. A projector may be positioned and configured to project dynamically alterable illumination signals onto a surface visible to the shopper when at the self-checkout area to provide visual guidance information to the shopper. In an embodiment, wherein positioning the projector includes positioning the projector to be a top-down projector, and the projector may be oriented to project at least one line onto a floor and in parallel to a structure of the bagging area.

The foregoing method descriptions and the process flow diagrams are provided merely as illustrative examples and are not intended to require or imply that the steps of the various embodiments must be performed in the order presented. As will be appreciated by one of skill in the art, the steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations may be performed in parallel or concurrently. In addition, the order of the operations may be re-arranged. A process may correspond to a method, a function, a procedure, a subroutine, a subprogram, etc. When a process corresponds to a function, its termination may correspond to a return of the function to the calling function or the main function.

The various illustrative logical blocks, modules, circuits, and algorithm steps described in connection with the embodiments disclosed here may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to and/or in communication with another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the invention. Thus, the operation and behavior of the systems and methods were described without reference to the specific software code being understood that software and control hardware can be designed to implement the systems and methods based on the description here.

When implemented in software, the functions may be stored as one or more instructions or code on a non-transitory computer-readable or processor-readable storage medium. The steps of a method or algorithm disclosed here may be embodied in a processor-executable software module which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used here, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The previous description is of a preferred embodiment for implementing the invention, and the scope of the invention should not necessarily be limited by this description. The scope of the present invention is instead defined by the following claims.

What is claimed is:

1. A retail store self-checkout station, comprising:
    a scanner configured to enable a shopper to scan items being purchased;
    a bagging area positioned at the scanner;
    a top-down facing camera positioned and oriented to image a shopping cart or basket at the self-checkout area and to generate image signals of the shopping cart or basket;
    a projector configured to project dynamically alterable illumination signals onto a surface visible to the shopper when at the self-checkout area to provide visual guidance information to the shopper, wherein the illumination signals form at least one elongated virtual lane line substantially parallel with a side wall that at least in part defines the bagging area and/or supports the scanner, the at least one virtual lane line being indicative of a position and orientation of the shopping cart or basket to be positioned at the self-checkout area; and
    a processor configured to:
    receive the image signals from the camera;
    process the image signals to determine whether the shopping cart or basket of the shopper is properly positioned and oriented at the self-checkout area by determining that at least a portion of the shopping cart or basket is outside one or more lines of the at least one elongated virtual lane line;
    and responsive to determining that the shopping cart or basket is not properly positioned and oriented at the self-checkout area, cause the projector to change an illumination signal from a first illumination state to a second illumination state to notify the shopper to reposition or reorient the shopping cart or basket.

2. The self-checkout station according to claim 1, wherein the first illumination state includes a first color and the second illumination state includes a second color.

3. The self-checkout station according to claim 1, wherein the processor is further configured to:
    identify an action indicative of an error or misbehavior by the shopper from the image signals received from the top-down facing camera; and
    responsive to identifying an action indicative of an error or misbehavior, communicate a control signal to cause the projector to alter the illumination signal from the first illumination state to a third illumination state.

4. The self-checkout station according to claim 3, further comprising an audible device configured to output audible signals, and wherein the processor is configured to generate and communicate audible data to the audible device in response to determining that (i) the shopping cart or basket is not properly positioned and oriented at the self-checkout area or (ii) the shopper made an error or performed an action that appears to be misbehavior.

5. The self-checkout station according to claim 3, further comprising an electronic display configured to output visible signals, and wherein the processor is further configured to generate and communicate visible data to the electronic display in response to determining that (i) the shopping cart or basket is not properly positioned and oriented at the self-checkout area or (ii) the shopper made an error or performed an action that appears to be misbehavior.

6. The self-checkout station according to claim 1, wherein the camera and projector are supported by a structure of the self-checkout area and positioned above an area adjacent to the self-checkout area at which the shopper is to place the shopping cart such that the illumination signals generated by the projector define a virtual lane.

7. The self-checkout station according to claim 1, further comprising a processor configured to:
    determine different states of a checkout process performed by shoppers at the self-checkout area; and
    communicate control signals that cause the projector to alter illumination states of the illumination signals, thereby causing the visual signals to be altered to guide the shopper in performing a self-checkout.

8. The self-checkout station according to claim 7, wherein the different states of the checkout process include at least a plurality of:
    (i) waiting for a customer;
    (ii) a customer placing a shopping cart or basket with one or more items at the self-checkout area;
    (iii) scanning items using the scanner and placing the scanned items into the bagging area;
    (iv) enabling the shopper to pay for the scanned item;
    (v) notifying the customer to remove the items from the bagging area;
    (vi) completing the self-checkout without detecting an error or misbehavior; and
    (vii) detecting an error or misbehavior and providing visual feedback via the projector.

9. The self-checkout station according to claim 1, further comprising a processor that executes a cart orientation estimation module to identify features of the shopping cart to determine position and orientation thereof.

10. The self-checkout station according to claim 1, wherein the processor is further configured to operate a state machine that transitions through a plurality of different phases of a self-checkout process, each phase having a different illumination effect provided by the projected illumination signals.

11. The self-checkout station according to claim 1, wherein the at least one elongated virtual lane line includes two elongated virtual lane lines that do not intersect.

12. A method of managing a retail store self-checkout station, said method comprising:
    receiving image signals from a top-down facing camera positioned and oriented to image a shopping cart or basket at the self-checkout area and to generate image signals of the shopping cart or basket;
    projecting, via a projector, dynamically alterable illumination signals onto a surface visible to a shopper when at the self-checkout area to provide visual guidance information to the shopper, the illumination signals forming at least one elongated virtual lane line substantially parallel with a side wall that at least in part defines the bagging area and/or supports the scanner, the at least one virtual lane line being indicative of a position and orientation of the shopping cart or basket to be positioned at the self-checkout area;
    processing the image signals to determine whether the shopping cart or basket of the shopper is properly positioned and oriented at the self-checkout area by determining that at least a portion of the shopping cart or basket is outside one or more lines of the at least one elongated virtual lane line; and
    responsive to determining that the shopping cart or basket is not properly positioned and oriented at the self-checkout area, communicating a control signal to the projector to change an illumination signal from a first illumination state to a second illumination state to notify the shopper at the self-checkout area to reposition or reorient the shopping cart or basket.

13. The method according to claim 12, wherein communicating the control signal to the projector to change from the first illumination state to the second illumination state includes communicating a control signal to the projector to cause the projector to change the illumination signal from a first color to a second color.

14. The method according to claim 12, further comprising:
    identifying an action indicative of an error or misbehavior; and
    responsive to identifying an action indicative of an error or misbehavior, communicating a second control signal to the projector to alter the illumination signal from the first illumination state to a third illumination state.

15. The method according to claim 12, further comprising supporting the camera and projector by a structure of the self-checkout area and positioned above an area adjacent to the self-checkout area at which the shopper is to place the shopping cart such that the illumination signals generated by the projector define a virtual lane.

16. The method according to claim 12, further comprising:
    determining different states of a checkout process performed by shoppers at the self-checkout area; and
    communicating different control signals based on the determined state of the checkout process to the projector to alter illumination states of the illumination signals, thereby causing the visual signals to be altered to guide the shopper in performing a self-checkout.

17. The method according to claim 16, wherein causing the projector to alter the illumination states based on the different states of the checkout process, the different states of the checkout process including at least a plurality of:
    (i) waiting for a customer;
    (ii) a customer placing a shopping cart or basket with one or more items at the self-checkout area;
    (iii) scanning items using the scanner and placing the scanned items into the bagging area;
    (iv) enabling the shopper to pay for the scanned item;
    (v) notifying the customer to remove the items from the bagging area;
    (vi) completing the self-checkout without detecting an error or misbehavior; and
    (vii) detecting an error or misbehavior and providing visual feedback via the projector.

18. The method according to claim 12, further comprising executing a cart orientation module to identify features of the shopping cart to determine position and orientation thereof.

19. A method of managing a retail store self-checkout area, comprising:
    providing a scanner configured to enable a shopper to scan items being purchased;
    providing a bagging area positioned at the scanner;
    positioning a top-down facing camera to image a shopping cart or basket at the self-checkout area and to generate image signals of the shopping cart or basket;

positioning a projector configured to project dynamically alterable illumination signals onto a surface visible to the shopper when at the self-checkout area to provide visual guidance information to the shopper, wherein the illumination signals form at least one elongated virtual lane line substantially parallel with a side wall that at least in part defines a bagging area and/or supports the scanner, the at least one virtual lane line being indicative of a position and orientation of the shopping cart or basket to be positioned at the self-checkout area by determining that at least a portion of the shopping cart or basket is outside one or more lines of the at least one elongated virtual lane line;

positioning a processor operably coupled with the top-down facing camera and configured to receive the image signals from the camera, process the image signals to determine whether the shopping cart or basket of the shopper is properly positioned and oriented at the self-checkout area, and responsive to determining that the shopping cart or basket is not properly positioned at the self-checkout area, cause the projector to change an illumination signal from a first illumination state to a second illumination state to notify the shopper to reposition or reorient the shopping cart or basket.

* * * * *